United States Patent Office 3,155,650
Patented Nov. 3, 1964

3,155,650
2-SUBSTITUTED-4-SULFANILAMIDOQUIN-
AZOLINES AND PROCESS
Frederick A. Grunwald, Evansville, Ind., assignor to Mead
Johnson & Company, Evansville, Ind., a corporation
of Indiana
No Drawing. Filed Mar. 3, 1961, Ser. No. 93,035
3 Claims. (Cl. 260—239.65)

This invention relates to a new class of compounds having therapeutic utility in the prevention and treatment of infections caused by microorganisms. These substances are 2-substituted-4-sulfanilamidoquinazolines of the following formula and the pharmacentically acceptable salts thereof. The invention also includes processes for the preparation of these useful products.

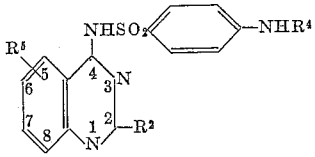

Formula I

In Formula I $R^2$ is a lower alkyl mercapto group, a lower alkenoxy group, a lower alkoxy group, a lower alkoxy substituted alkoxy group, or a monovalent lower aliphatic hydrocarbon group unsubstituted or bearing a lower alkoxy substituent. $R^4$ is a hydrogen atom or an aliphatic hydrocarbon acyl group. Each of these groups, $R^2$ and $R^4$, contains up to a maximum of six carbon atoms. $R^5$ is hydrogen methyl, methoxy, or chlorine, and is attached at one of the 5, 6, 7, or 8 positions of the quinazoline nucleus. For clarity, the positions of the quinazoline nucleus are numbered in Formula I.

This application is a continuation-in-part of my copending application, Serial Number 28,522, filed May 12, 1960, now abandoned.

The present sulfanilamidoquinazolines are a useful and valuable addition to the family of sulfa drugs. They, however, have substantial advantages over related members of this class of drugs. They provide higher and more prolonged blood concentrations in mammals upon oral administration thereto. They have low toxicities. They are widely distributed to various tissues of the body except the brain and are retained for substantial periods of time. Very limited amounts of these drugs diffuse into the brain tissue. Urinary concentrations following administration thereof are very low, while tissue concentrations in the kidney and other organs are high. Rapid circulation on or within the red blood cells as well as in the serum upon administration of these substances appears to occur and substantial fecal concentrations are obtained. As a result of this combination of pharmacological properties, these novel sulfa drugs have advantages for therapeutic administration which reside in part in the lower incidence of side effects engendered thereby, the wider margin of safety, and in the lower, less frequent dosages required. A number of members of the series are more potent both therapeutically and prophylactically than prior related products.

The present sulfanilamidoquinazolines are administered in dosages of from between 5 and 250 mg./kg. body weight per day by the oral or the parenteral routes. They may be conveniently formulated into tablets or capsules, etc., containing from 50 to about 500 mg. of the active ingredient, or they may be formulated into various liquid preparations, such as elixirs, suspensions, solutions, etc., adapted for parenteral use or for oral pediatric use. For the latter purpose, they may be formulated into preparations containing from 25 to 125 mg./ml. They may also be administered in combination with other drugs, such as the antibiotics, including the macrolyde antibiotics, the penicillins, and the tetracyclines, or with anti-inflamatory or antipyretic drugs, such as the salicylates, etc.

Particularly preferred embodiments of the present invention are the substances having the following formula and the pharmaceutically acceptable metal salts thereof.

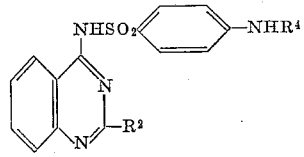

Formula II

In Formula II $R^2$ is either a methyl or a methoxy group, and $R^4$ is either a hydrogen atom, an acetyl group, or a propionyl group.

The pharmaceutically acceptable metal salts of both the broad class of sulfanilamidoquinazolines of the present invention as well as the instant preferred sub-group include sodium, potassium, calcium, zinc, magnesium, and aluminum salts. By pharmaceutically acceptable is meant metals which are nontoxic in the dosages required for administration of the present products. The products of Formula II are a preferred sub-group by virtue of their high degree of antibacterial activity as is reflected in animal protection studies, their low toxicity, and the generally accentuated character of the pharmacological properties listed above.

Preferred species include 2-methoxy-4-sulfanilamido-quinazoline, its sodium salt, and its $N^4$-acetyl derivative. The latter is unique among $N^4$-acetylated sulfa drugs, since it is fully effective therapeutically and actually may have enhanced activity. It appears to be rapidly deacetylated in vivo, and is water soluble at physiological pH's. The sodium salt is a highly desirable product in view of its high water solubility at pH 8 to 9 suiting it for intravenous administration. The $N^4$-acyl derivatives of prior sulfa drugs are biologically inactive substances totally unsuited for therapeutic use. The present $N^4$-acyl derivatives are not to be confused with the $N^1$-acetyl derivatives of certain sulfa drugs which have found some use in therapeutics.

The present substances are prepared by reaction of intermediates of Formula III with the alkali metal salts of sulfanilamide (Formula IV) according to the following equation.

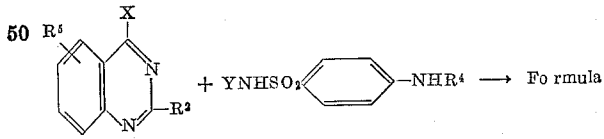

Formula III        Formula IV in Formulas III and IV, X is either an alkoxy, alkoxy-substituted alkoxy, or alkylmercapto group, and $R^2$, $R^4$, and $R^5$ have the meaning previously defined. Y represents an alkali metal cation, such as sodium, potassium, or lithium, the metal of the alkali metal salt of sulfanilamide used as reactant.

The reaction is carried out at temperatures of from 80 to 155° C. for periods varying from an hour or more to several days. The use of diluents comprising inert organic liquids greatly facilitates the handling of the reaction mixture. For this purpose, solvents for the reactants at the reaction temperature are preferred. These include the polar organic liquids, such as the alkanols, the glycols, nad polyhydric alcohols, and ethers thereof. Methanol, ethanol, and the monomethyl ether of ethylene glycol have been found to be particularly useful.

For the preparation of the products of the present invention with optimum efficiency wherein $R^2$ is alkoxy or an alkoxy substituted alkoxy group, it is preferred to employ those substances of Formula III wherein X is an alkoxy or alkoxy substituted alkoxy group, such as methoxy, ethoxy, propoxy, beta-methoxyethoxy, etc., as starting materials. The alkoxy substituted alkoxy compounds of the present invention have also been obtained by an alcohol exchange type of reaction whereby a simple 2-alkoxy compound is heated in the presence of an alkali metal base, such as potassium ethoxide or sodium methoxide, in a monoether of ethylene glycol, propylene glycol, etc., resulting in replacement of the 2-alkoxy substituent with an alkoxy substituted alkoxy group corresponding to the solvent. In some instances these alkoxy substituted alkoxy products are isolated as by-products in the manufacture of the simple alkoxy substituted compounds when employing a glycol monoether as solvent.

For preparation of the 2-hydrocarbon substituted 4-sulfanilamido quinazolines and the alkoxy substituted hydrocarbon analogs thereof with peak efficiency and economy, the 4-alkylmercapto substituted quinazolines, Formula III wherein X is an alkylmercapto group, are preferred starting materials. The reaction is conducted under much the same conditions as have been outlined for the preparation of the 2-alkoxy compounds. The 5, 6, 7, or 8 substituted compounds are prepared from either type of starting material bearing the appropriate benzenoid substituent. These and other intermediates are prepared according to procedures which appear below and according to methods known to those skilled in the art.

The $N^4$-acyl derivatives (Formula I $R^4$-acetyl, propionyl, butyryl, pentanoyl, hexanoyl, etc.) are prepared either by the aforesaid methods employing appropriately substituted sulfanilamide salt as starting material, or by direct acylation of the appropriate 2-substituted-4-sulfanilamidoquinazoline product of the present invention. The latter method is preferred due to the high yields obtained and the relative ease of operation. Direct acylation is carried out by treatment of the sulfanilamido quinazoline with an acylating agent such as the anhydride or acid chloride of the desired acid or with a mixed anhydride thereof with a carbonic acid monoester.

INTERMEDIATES

2,4-Dichloroquinazoline

To a mixture of 39.2 grams of 2,4-dihydroxyquinazoline and 80 grams of tri-n-propylamine (N,N-dimethylaniline or N,N-diethylaniline may be substituted) contained in a 1 liter round bottom flask, protected from moisture by a $CaCl_2$ drying tube, there is added in one portion 314 grams of phosphorus oxychloride. The reaction flask is agitated by hand with intermittent cooling in an ice water bath to maintain the reaction temperature at about 30°–40° C. Solution is complete in 10 minutes. A reflux condenser is put in place and the reaction mixture heated on the steam bath with stirring for 15 minutes. The excess phosphorus oxychloride is removed in vacuo on the steam bath and two successive 250 ml. portions of toluene are distilled from the residue to insure complete removal of phosphorus oxychloride.

The dark residue is extracted with six 250 ml. portions of a hot mixture (1:10:89) of tri-n-propylamine, benzene, and n-heptane. To the cooled combined extracts is added sufficient benzene to make 2 liters and the total solution is washed with two 250 ml. portions of 0.1 N NaOH and one 250 ml. portion of distilled water. The organic phase is separated, dried over $MgSO_4$, filtered, and concentrated in vacuo until most of the solvent is removed. The residue is recrystallized once from 250 ml. of a mixture (1:10:89) of tri-n-propylamine, benzene, and n-heptane yielding 40.7 grams (84%) of yellow crystalline product, M.P. 117–120° C.

2-Chloro-4-Methoxyquinazoline

To a freshly prepared solution of 9.45 grams of metallic sodium in 500 ml. of absolute methanol in a 1 liter Erlenmeyer flask, protected from moisture by a $CaCl_2$ drying tube, there is added 19.2 grams of phenol. The mixture is cooled to room temperature and 40.7 grams of 2,4-dichloroquinazoline are added with shaking. The reaction mixture is heated just to boiling and allowed to stand at room temperature overnight, sodium chloride, 12.0 g., precipitates and is separated by filtration. The amber-colored filtrate is concentrated in vacuo to about ⅔ the original volume and poured into 2 liters chilled water. Filtration yields 33.3 grams of product as a white amorphous solid, M.P. 74–91° C.

2,4-Dimethoxyquinazoline

To a freshly prepared solution of 4.92 grams of metallic sodium in 300 ml. absolute methanol contained in a 1 liter Erlenmeyer flask, protected from moisture by a $CaCl_2$ drying tube, there is added 36.2 grams of 2-chloro-4-methoxyquinazoline. The mixture is warmed gently until a precipitate of NaCl appears, and then is heated to boiling. After standing at room temperature over the week end, the precipitated NaCl is separated by filtration and the filtrate concentrated in vacuo almost to dryness. The wet white residue is triturated under 150 ml. of distilled $H_2O$. The crude product has the form of a white amorphous solid, M.P. 69–74° C. After one recrystallization from a mixture of 150 ml. (95%) ethanol and 225 ml. $H_2O$, there is obtained 32.5 grams of product having the crystalline form of white needles, M.P. 72–75° C.

2,4-Diethoxyquinazoline 2,4-dichloroquinazoline, 30 g. (0.15 mole), is added to a solution of sodium ethoxide prepared by dissolving 6.9 g. (0.30 atom) of sodium in 350 ml. of absolute ethanol. An exothermic reaction occurs when the dichloroquinazoline is added to the sodium ethoxide solution. When this subsides the mixture is heated at reflux for four hours. The solution is then concentrated in vacuo to a volume of about 150 ml. and poured into 1500 ml. of ice water. A light amber-colored oil precipitates which readily solidifies to a slightly gray solid. The solid is collected by filtration, washed on the filter, and dried to yield 30.2 g. (92.5%) of the desired product, M.P. 55–56° C. (reported, M.P. 55° C., Lange et al., J. Am. Chem. Soc. 52, 3696 (1930)).

2,4-Di(n-Propoxy)Quinazoline

This material is prepared according to the method described by Bogert and May, J. Am. Chem. Soc. 31, 513 (1909).

2,4-Di(Iso-Propoxy)Quinazoline 2,4-dichloroquinazoline, 35.0 g. (0.176 mole) is cautiously added to a solution of sodium isopropoxide prepared by dissolving 8.1 g. (0.35 gram atom) of sodium in absolute isopropyl alcohol. The solution is refluxed for 15 hours, precipitated sodium chloride removed by filtration, and the filtrate concentrated to a viscous, dark oil. The oil is treated with 300 ml. of ether, resulting in the formation of a tan precipitate, which is separated and discarded. The ethereal filtrate is dried over anhydorus magnesium sulfate, the drying agent removed by filtration, and the filtrate concentrated to a brown, viscous oil, 22.2 g. (51%). This material is satisfactory for further conversion without additional purification.

Allyl alcohol, hexanol, and other lower aliphatic alkoxy-alcohols containing up to six carbon atoms may be analagously employed in the preparation of 2,4-di(allyloxy)quinazoline, 2,4-di(n-hexyloxy)quinazoline, and other di-alkoxy, dialkoxyalkoxy, and di-alkenoxy quinazolines.

2-Methyl-4-Methylthioquinazoline

An excellent procedure for the preparation of the next lower homolog of this substance, 4-methylthioquinazoline, from 4-mercaptoquinazoline and dimethyl sulfate is described by Leonard and Curtin in Journal of Organic Chemistry, 11, 349 (1946). Their procedure is readily adapted to the preparation of 2-methyl-4-mercaptoquinazoline by the substitution of 2-methyl-4-mercaptoquinazoline, which is prepared by the method of Tomisek and Christensen, J. Am. Chem. Soc., 70, 2423 (1948), as starting material.

*2 - Ethyl-4-Mercaptoquinazoline, 2-n-Propyl-4-Mercaptoquinazoline, and 2 - (Beta-Methoxyethyl)-4-Mercaptoquinazoline*

A method for the preparation of 2-alkyl-4-quinazolones has been described by D. T. Zentmyer et al., in Journal of Organic Chemistry, 14, 967 (1949). The 2-ethyl and 2-n-propyl compounds, and others are described there. This method is adapted in analagous fashion to the preparation of the 2-(beta-methoxyethyl)-4-quinazolone, by substitution of N - (beta-methoxypropionyl)anthranilic acid as starting material in the method given.

The 2-alkyl substituted 4-quinazolones are then converted to the 2-alkyl-4-mercaptoquinazolines by the following method, which specifically illustrates the preparation of 2-ethyl-4-mercaptoquinazoline. Anhydrous pyridine (dried over anhydrous calcium sulfate), 400 ml., is placed in a 1 l. flask fitted with a reflux condenser, capped by a drying tube, and 27.7 g. (0.159 mole) of 2-ethyl-4-quinazolone and 42 g. (0.190 mole) of phosphorous pentasulfide are added to it. The mixture is then heated at reflux temperature for 1½ hrs., cooled, and poured into twice its volume of a mixture of cracked ice and water. The aqueous slurry is stirred at room temperature for several hours during which time a brown, yellow-colored solid separates. It is collected by filtration, washed with water, and dried, yielding 23.7 g. of crude product (78%), M.P. 190–192° C. The crude product is purified by dissolving in 2 N sodium hydroxide, treating the alkaline solution at room temperature with decolorizing carbon, filtering the carbon, adjusting the filtrate to pH 5 with acetic acid. The product separates as a light, amber-colored amorphous solid which is collected by filtration, washed well with water, and dried to yield 20.4 g. (68%) of 2-ethyl-4-mercaptoquinazoline.

*2-Ethyl-4-Methylthioquinazoline*

The method described above for the preparation of the 2-methyl-4-methylthioquinazoline is adapted to the preparation of this substance. It is obtained as a dark, amber-colored oily solid, M.P. 30–35° C. This material is satisfactory for further transformation without additional purification.

This procedure is similarly adaptable to the preparation of 2-n-propyl-4-methylthioquinazoline and to the preparation of 2-(beta-methoxyethyl)-4-methylthioquinazoline.

*2,4-Dimethoxy-6-Chloroquinazoline*

2,4,6-trichloroquinazoline (Curd et al., J. Chem. Soc. (1948), 1762), 19.7 g. (0.084 mole) is added to a solution of 0.20 mole of sodium methoxide in 310 ml. of absolute methanol and the mixture refluxed under anhydrous conditions for 3.5 hrs. The solution is then concentrated under reduced pressure until the bulk of the methanol has been removed. The residual mixture crystallizes when treated with 1500 ml. of water. The crystalline product is collected, washed, and dried, yielding 16.59 g. (87.7%) of the desired intermediate, M.P. 116–120° C.

*4-Methoxyanthranilic Acid*

This substance is used as an intermediate in preparing the 7-methoxyquinazolines of the present invention. A convenient preparation of it follows the sequence given below in which the various intermediates are named along with a literature reference describing their preparation.

2-nitro-4-methoxyacetanilide (Fanta and Tarbell, Organic Syntheses, 25, 78 (1945)).

2-nitro-4-methoxyaniline (A. H. Cook et al., J. Chem. Soc. (1945), 861).

2-nitro-4-methoxybenzoic acid (N. D. Chapman et al., J. Chem. Soc. (1947), 890).

4-methoxyanthranilic acid (L. Katz et al., J. Org. Chem. 18, 1380, 1953)).

*7-Methoxyquinazoline-2,4-Dione*

A suspension of 29 g. (0.48 mole) of glacial acetic acid and 65 g. (0.39 mole) of 4-methoxyanthranilic acid in 1.6 l. of water at room temperature is stirred while a solution of 38 g. (0.47 mole) of potassium cyanate in 380 ml. of water is added in dropwise fashion. An ice bath is put in place, and the mixture is treated with 530 g. (13.25 mole) of sodium hydroxide pellets at such a rate that the reaction temperature does not exceed 30° C. Approximately 2½ hrs. is required for addition of the sodium hydroxide pellets. An amber-colored solution results which is stirred at room temperature for 24 hrs. and then cooled at 4° C. for an additional 24 hrs. The sodium salt of 7-methoxy-2,4-quinazolinedione precipitates and is collected, washed, and dried, weight 83 g. 7-methoxyquinazoline-2,4-dione is obtained by dissolving the sodium salt in 750 ml. of boiling water, filtering insoluble material, and acidifying the clear filtrate with dilute sulfuric acid to pH 4. The precipitated product is collected on a filter, washed first with water and then with acetone, and dried, yielding 46.5 g. (62%) of the desired substance, M.P. 312–320° C. (reported M.P. 300–301° C.) (F. Curd et al., J. Chem. Soc. (1948), 1759).

*2,4-Dichloro-7-Methoxyquinazoline*

A mixture of 40 g. (0.207 mole) of 7-methoxyquinazoline-2,4-dione, 89.5 g. (0.625 mole) of tri-n-propylamine, and 320 ml. (2.07 mole) of phosphorus oxychloride is heated on a steam bath for 15 minutes. Excess phosphorus oxychloride is then removed by concentration at reduced pressure on a steam bath by adding several small portions of toluene and distilling these at reduced pressure to ensure removal of last traces of phosphorus oxychloride. The residue is then extracted with an 8:2:0.1 solvent mixture of n-heptane:benzene: tri-n-propylamine, the extracts diluted with benzene, and the diluted solvent mixture extracted with 1 N sodium hydroxide, washed with water, and dried over anhydrous magnesium sulfate. The drying agent is removed by filtration and the filtrate concentrated to dryness under reduced pressure, yielding the desired intermediate as crystalline yellow needles weighing 49.5 g. (87%), M.P. 117–120° C.

*2,4,7-Trimethoxyquinazoline*

A solution of 10.0 g. (0.44 gram atom) of sodium in 650 ml. of absolute methanol is added with shaking to 41.5 g. (0.182 mole) of 2,4-dichloro-7-methoxyquinazoline. The resulting suspension is then heated at reflux temperature for 3 hrs., poured into 2 l. of water, and the precipitated solid collected, washed, and dried. The dried solid is recrystallized once from aqueous ethanol, yielding 34 g. (85%) of the desired intermediate as white, needle-like crystals, M.P. 102–104° C.

*6-Methylquinazoline-2,4-Dione*

5-methylanthranilic acid (B. R. Baker et al., Journal of Organic Chemistry, 17, 141 (1952)), 6.1 g. (0.405 mole), is added to 1940 ml. of water containing 30 ml. (0.525 mole) of glacial acetic acid. The mixture is allowed to cool to room temperature and a solution containing 41.5 g. (0.512 mole) of potassium cyanate in 138 ml. of water is added to it in dropwise fashion over a 3 hr. period. The mixture is stirred for an additional ½ hr. at room temperature. A cooling bath is placed under the reaction vessel and 553.2 g. (13.8 mole)

of flaked sodium hydroxide is added in portion-wise fashion to the reaction mixture over a 1¼ hr. period. The temperature is maintained below 30° C. during the addition. The mixture is agitated at room temperature for 15 hrs. and then chilled to 4° C. for 48 hrs. The sodium salt of the desired intermediate crystallizes from solution during this period. It is collected by filtration, dissolved in 2770 ml. of hot water (85–90° C.), insoluble materials removed by filtration, and the filtrate acidified with aqueous sulfuric acid (1:1) until an acid reaction to litmus paper is exhibited. 6-methylquinazoline-2,4-dione precipitates and is collected, washed on the filter, and dried, yield 63.7 g. (89%), M.P. 315–340° C.

*2,4-Dichloro-6-Methylquinazoline*

Phosphorus oxychloride, 70.0 g. (0.456 mole), is added in 1 portion with mixing to 10.0 g. (0.057 mole) of 6-methylquinazoline-2,4-dione and 18.9 g. (0.132 mole) of anhydrous tri-n-propylamine. An exothermic reaction occurs on mixing. After this has subsided, the mixture is heated at 100° C. for 1½ hrs. Excess phosphorous oxychloride is distilled in vacuo and last traces thereof are removed by the successive addition of three 100 ml. portions of toluene to the flask and distillation thereof. The residue is then extracted with a solvent mixture made up of 1:15:84 tri-n-propylamine:benzene:n-heptane. The combined solvent extracts are diluted with 150 ml. of benzene and washed with one 200 ml. portion of 0.3 N sodium hydroxide followed by two 150 ml. portions of water. The organic layer is then dried over anhydrous magnesium sulfate, the solvent distilled, and the desired intermediate weighing 11 g. obtained as a solid residue which is suitable for further transformation as described hereafter.

*2,4-Dimethoxy-6-Methylquinazoline*

A solution of 6.48 g. (0.12 mole) of sodium methoxide in methanol is added to a flask of appropriate size containing 11 g. (0.05 mole) of 2,4-dichloro-6-methylquinazoline. The mixture is then heated at reflux under anhydrous conditions, for 3 hrs., the solution evaporated almost to dryness, and the residue mixed with 350 ml. of water. The desired product separates as a solid precipitate, which is collected, washed, and dried, yield 10.4 g. (92%), M.P. 70° C. It is purified by recrystallization from methanol-water to yield 8.78 g. of the purified 2,4-dimethoxy-6-methylquinazoline, M.P. 73–74° C.

*2,4-Bis(Methylthio)Quinazoline*

This intermediate may be prepared according to the method of Meerwein et al., Chem. Ber., 89, 209 (1956). It is more conveniently obtained, however, by reaction of sodium methylmercaptide with 2,4-dichloroquinazoline in boiling anhydrous methanol. The product is recovered from the reaction solution by distillation of the bulk of the solvent and replacement of it with water. 2,4-bis-(methylthio)quinazoline is readily recrystallized from low boiling petroleum ether (30–60° C.). Material purified in this fashion exhibits M.P. 61–64° C.

The following examples are presented as illustrating various specific embodiments of the present invention. They are not to be considered as limiting the scope thereof, however.

In reaction of the appropriately substituted 4-alkoxy or 4-alkylmercaptoquinazolines with alkali metal salts of sulfanilamide according to Examples I–XV, which follow, the use of sodium sulfanilamide has been specifically illustrated. Lithium sulfanilamide and potassium sulfanilamide may be used interchangeably therewith in these procedures. Preparation of these reactants is within the skill of the art involving, for instance, reaction of potassium ethoxide, potassium t-butoxide, or lithium amide with sulfanilamide in an anhydrous solvent for the reactants.

EXAMPLE I

*2-Methoxy-4-Sulfanilamidoquinazoline*

To a freshly prepared solution of 3.93 grams of metallic sodium in 100 ml. absolute methanol, contained in a 500 ml. round bottom flask (fitted with reflux condenser and protected from moisture by a $CaCl_2$ drying tube), there is added 29.4 grams of sulfanilamide. The mixture is heated on the steam bath for 15 minutes and the solution then evaporated to dryness in vacuo. The white residue of sodium sulfanilamide is dissolved in 200 ml. methyl Cellosolve, 32.5 grams of 2,4-dimethoxyquinazoline is added thereto, and the solution then refluxed with stirring for 6¼ hours. It is then cooled and concentrated in vacuo to 125 ml., chilled, and poured into 500 ml. of distilled $H_2O$. The resulting clear amber solution is neutralized with 1 N HCl. The brown amorphous precipitate which forms is allowed to settle, separated by decanting the supernatant liquid, and the residue suspended in 150 ml. of 95% ethanol. Filtration yields 11.3 grams of a white amorphous solid, M.P. 225–230° C. One recrystallization from methyl Cellosolve and two recrystallizations from aqueous N,N-dimethylformamide yield 5.8 grams of the desired product as light yellow-colored needles, M.P. 249–251° C.

The process may also be satisfactorily carried out in refluxing ethanol as solvent. A somewhat longer reaction period is required to give equivalent yield of product.

2-methoxy-4-sulfanilamidoquinazoline is a white crystalline tasteless solid. At room temperature its water solubility in pH 7.4 aqueous phosphate buffer is 5.5 mg. per 100 ml. In pH 5.5 aqueous phosphate buffer its solubility is 4.5 mg. per 100 ml. Its solubility in chloroform is 3 to 4 times as great as its solubility in water. In non-buffered aqueous solutions of from pH 2.5 to 6.0 in which the pH is adjusted by the addition of hydrochloric acid or sodium hydroxide, the substance exhibits a solubility of between 1.5 and 2.0 mg. per 100 ml. Its solubility similarly measured at pH 7.2 is 3.9 mg. per 100 ml., and at pH 7.7 9.3 mg. per 100 ml.

EXAMPLE II

*2-Ethoxy-4-Sulfanilamidoquinazoline*

A solution of 19.42 g. (0.1 mole) of sodium sulfanilamide in 160 ml. of methyl Cellosolve is prepared and about 10 ml. of the solvent distilled therefrom at reduced pressure to remove traces of moisture. To the remaining solution there is added 21.8 g. (0.1 mole) of 2,4-diethoxyquinazoline. The reaction mixture is protected from the atmosphere and heated at reflux temperature (about 125° C.) for 6½ hrs. The mixture is then concentrated at reduced pressure to about 75 ml., cooled, and poured into 360 ml. of cold water. Unreacted 2,4-diethoxyquinazoline precipitates as a light amber-colored oil which solidifies. This material is removed by extraction of the alkaline aqueous mixture with two 200 ml. portions of ether. The aqueous raffinate is then neutralized with the 1 N hydrochloric acid resulting in precipitation of the product which is collected. The crude, wet material is then triturated with 25 ml. of methanol, the solid separated by filtration and washed with 25 ml. of methanol. The filter cake is dried to constant weight to provide the desired product, 8.4 g. (24.4%) of a slightly gray solid, M.P. 233–235° C. This material is recrystallized from 1:2 methyl Cellosolve:water to yield 6.15 g. (18%) of the desired product as glistening cream-colored platelets, M.P. 239.5–241.5° C.

EXAMPLE III

*2-Methoxy-4-($N^4$-Acetylsulfanilamido)Quinazoline*

A suspension of 6.60 g. (0.02 mole) of 2-methoxy-4-sulfanilamidoquinazoline in 30 ml. of 75% aqueous acetic acid is prepared. It is stirred and 6.15 g. (0.06 mole) of acetic anhydride is added thereto in one portion. A mildly exothermic reaction occurs. The mixture is then kept at room temperature for 45 minutes, and then warmed in a water bath at 45–50° C. for 30 minutes with stirring. After stirring for an additional 30 minutes at room temperature, the flask is chilled in ice and the solid collected by filtration. The cake is suspended in 50 ml. of water and again collected on the filter, washed with water, and then with ether. This material is recrystallized from an ethanol-water mixture, yielding the desired product as the monohydrate, M.P. 240–242° C.

2 - methoxy - 4-($N^4$-acetylsulfanilamido)quinazoline is considerably more soluble in water than 2-methoxy-4-sulfanilamidoquinazoline. In water adjusted to pH 4.0 with hydrochloric acid its solubility is 7.1 mg. per 100 ml. and at pH 6.6, 8.9 mg. per 100 ml. In aqueous solutions adjusted to pH 7.35 with sodium hydroxide its solubility is 31 mg. per 100 ml. Its distribution coefficient between chloroform and water is 1 in the range pH 1 to pH 2, and at pH 7.6.

EXAMPLE IV

*Sodium 2-Methoxy-4-Sulfanilamidoquinazoline*

A solution of sodium methoxide is prepared by dissolving 3.165 g. (0.1377 g. atom) of sodium in 250 ml. of methanol. 2-methoxy-4-sulfanilamidoquinazoline, 45.5 g. (0.1377 mole), is added thereto, forming a light amber-colored solution which is mixed at room temperature for 1 hr., filtered to remove insoluble material, and diluted, while stirring, with 1500 ml. of anhydrous ether. The desired sodium salt precipitates as an amber-colored granular solid. This material is purified by redissolving it in 200 ml. of methanol, treating the solution with decolorizing charcoal, filtering the charcoal, and diluting the methanol filtrate with 750 ml. of anhydrous ether. A small amount of amber-colored oil precipitates. The supernatant liquid is decanted and crystallization of the product therefrom permitted to take place. The crystalline monosodium salt forms and is collected, washed, and dried, weight 36.3 g. (75%), M.P. 287–289° C.

Other metal salts are prepared in analogous fashion by substituting appropriate bases for the sodium methoxide in this procedure. Examples of suitable bases include potassium ethoxide, calcium hydride, aluminum isopropoxide, etc. Alternatively these and other salts such as the magnesium and zinc salts may be prepared by metathetical processes in solution from the sodium salt, by selecting a solvent, such as water or an alkanol, in which the desired salt is insoluble.

EXAMPLE V

*2-n-Propoxy-4-Sulfanilamidoquinazoline*

A solution containing 22.8 g. (0.1174 mole) of sodium sulfanilamide in 150 ml. of 2-methoxyethanol is prepared, to which 28.83 g. (0.117 mole) of 2,4-di-n-propoxyquinazoline is added. It is refluxed with stirring for 27 hrs. while protected from the atmosphere. The solution is then concentrated in vacuo to ½ its original volume and then diluted with 300 ml. of water. Unreacted 2,4-di-n-propoxyquinazoline and other contaminants are then removed by extraction of the aqueous solution with three 200 ml. portions of ether. The aqueous raffinate is then neutralized with dilute hydrochloric acid and the precipitated product, 16 g. (38%), is collected, washed, and dried, M.P. 204–208° C. It is recrystallized from a methanol-water mixture to yield the pure crystalline substance, M.P. 216–217° C.

EXAMPLE VI

*2-Isopropoxy-4-Sulfanilamidoquinazoline*

A solution of 2,4-di-(isopropoxy)quinazoline, 22.2 g. (0.090 mole), and sodium sulfanilamide, 17.5 g. (0.90 mole), in 125 ml. of 2-methoxyethanol is prepared and refluxed under anhydrous conditions for 48 hrs. The solution is then concentrated at reduced pressure to ½ its original volume and then diluted with an equal volume of water. Neutral and basic contaminants are removed by extraction of this solution with two 100 ml. portions of ether, and the aqueous raffinate is neutralized with dilute hydrochloric acid. The product precipitates and is collected by filtration. It is washed on the filter and dried, yielding 12.3 g. (38%) of the desired product, M.P. 210–215° C. This material is further purified by recrystallization from methanol-water. The pure crystalline substance exhibits M.P. 226–227° C. dec.

EXAMPLE VII

*2-Methoxy-4-($N^4$-Butyrlsulfanilamido)Quinazoline*

To a suspension of 13.2 g. (0.04 mole) of 2-methoxy-4-sulfanilamidoquinazoline in 60 ml. of a 3:1 mixture of butyric acid:water, there is added 19.0 g. (0.12 mole) of butyric anhydride. A slight exothermic effect occurs. The mixture is stirred at 45–50° C. (bat temperature) for 20 minutes and then for 1½ hrs. at room temperature. The precipitated solid is collected by filtration and washed with water. The crude product so obtained is twice recrystallized from 1:1 dimethylformamide:water to yield the purified product, M.P. 248–250° C.

EXAMPLE VIII

*2-(beta-Methoxyethoxy)-4-Sulfanilamidoquinazoline*

A solution containing 0.1 mole of 2,4-di-(beta-methoxyethoxy)quinazoline and 0.10 mole of the sodium salt of sulfanilamide in approximately 200 ml. of methyl Cellosolve is prepared and refluxed for 96 hrs. The solution is then concentrated to about 100 ml. in vacuo and diluted with 500 ml. of water. The diluted concentrate is then extracted with three 100 ml. portions of ether. The aqueous raffinate is acidified to pH 6, chilled in an ice bath, and a crop of light amber-colored solid collected. This material is recrystallized from 2-methoxyethanol-water, yielding the pure crystalline 2-(beta-methoxyethoxy)-4-sulfanilamidoquinazoline, as the monohydrate, M.P. 182–185° C.

EXAMPLE IX

*2-Methyl-4-Sulfanilamidoquinazoline*

A mixture of 14.1 g. (0.074 mole) of 2-methyl-4-methylthioquinazoline and 15.8 g. (0.0815 mole) of sodium sulfanilamide is heated with stirring in 200 ml. of boiling dimethylformamide. The reaction mixture is protected from atmospheric moisture by means of a calcium chloride drying tube. Heating is continued for 6 hrs. The mixture is then cooled to room temperature, diluted with 3 l. of water, and the dark gum-like material which precipitates is removed by filtration. The filtrate is diluted to 4 l. with water, neutralized with 1N hydrochloric acid, and kept at room temperature for 1 hr. to permit the product to crystallize. The product separates as a yellow solid which is collected, washed, and dried, yielding 14.5 g. (62%) of 2-methyl-4-sulfanilamidoquinazoline, M.P. 245–249° C. This product is recrystallized from warm methyl Cellosolve containing water to the point of incipient crystallization and again from dimethylformamide containing water to the point of incipient crystallization. The pure crystalline material is separated on cooling of the crystallization solution, washed, and dried, yield 5.3 g. (23%), M.P. 282–284° C.

EXAMPLE X

*2-Ethyl-4-Sulfanilamidoquinazoline*

A solvent mixture made up of 120 ml. of methyl Cellosolve and 40 ml. of absolute methanol containing 16.32 g. (0.08 mole) of 2-ethyl-4-methylthioquinazoline and 15.53 g. (0.08 mole) of sodium sulfanilamide is protected from the atmosphere and refluxed with stirring for 90 hrs. (reaction temperature 90° C.). The solution is then concentrated in vacuo to about 50 ml. and diluted to 400 ml. with water. The solution becomes turbid upon dilution and is extracted with one 200 ml. portion of ether. The alkaline aqueous layer is then chilled in an ice bath and adjusted to pH 6 with 1 N hydrochloric acid. After continued chilling the precipitate, an amber-colored solid, is collected by filtration, washed and dried, yielding approximately 14 g. of crude product, M.P. 175–185° C. The product appears to be contaminated with a more soluble low melting material. This is removed by trituration with 75 ml. of methanol. The insoluble residue, 6 g., M.P. 205–210° C. is twice recrystallized from methyl Cellosolve-water employing decolorizing carbon to remove colored impurities. There is obtained 2.5 g. of a light yellow crystalline solid, M.P. 247–249° C.

EXAMPLE XI

2-Methoxy-4-Sulfanilamido-6-Chloroquinazoline 2,4-dimethoxy-6-chloroquinazoline, 16.58 g. (0.074 mole), is added to a solution of 14.35 g. (0.074 mole) of sodium sulfanilamide in a solvent mixture made up of 64 ml. of 2-methoxy-ethanol and 35 ml. of absolute methanol. The mixture is then protected from the atmosphere and refluxed for 47 hrs. (reaction temperature 85° C.). A condenser arranged for distillation is then put in place and the solution volume reduced to about ½ the original value by distillation. The concentrate is chilled in an ice bath, and poured into 250 ml. of water. Impurities are removed by extraction of this solution with two 150 ml. portions of ether and the aqueous raffinate neutralized with dilute hydrochloric acid, resulting in precipitation of 21.4 g. (79.5%) of crude product, M.P. 210–227° C. This material is recrystallized from hot dimethylformamide containing sufficient water to induce incipient crystallization and the solution set aside to crystallize. The purified product is recovered in 32% overall yield, M.P. 259–261° C.

EXAMPLE XII

2,7-Dimethoxy-4-Sulfanilamidoquinazoline

A solution of sodium methoxide is prepared by dissolving 3.56 g. (0.155 gram atom) of sodium in 95 ml. of absolute methanol. Sulfanilamide, 25.5 g. (0.155 mole) is added to this solution with stirring resulting in the formation of a thick paste. Methyl Cellosolve, 230 ml., is added to this mixture, which is then agitated until a clear solution forms. 2,4,7-trimethoxyquinazoline, 34.0 g. (0.155 mole) is then added to the solution, which is heated at its boiling point (85° C.) for 72 hrs. with stirring. A condenser arranged for distillation is then put in place and the solvent is permitted to distil until the solution temperature reaches 100° C. The mixture is then refluxed for an additional 24 hrs. The reaction mixture is then poured into a large beaker containing approximately 100 g. of cracked ice, and the resulting mass diluted with 1 l. of cold water. The resulting slurry is adjusted to pH 5 with glacial acetic acid. The product precipitates as an oil which is separated by decanting the supernatant liquid. The oil is then treated with 200 ml. of absolute methanol, which causes it to solidify. The crude product is collected, washed, and dried, weight 7.5 g. (13.3%), M.P. 225–230° C. The pure crystalline material is obtained by twice recrystallizing this material from aqueous dimethylformamide, M.P. 230–232° C.

EXAMPLE XIII

2-Methoxy-6-Methyl-4-Sulfanilamidoquinazoline

A solution of 8.78 g. (0.043 mole) of 2,4-dimethoxy-6-methylquinazoline in 8.37 g. (0.043 mole) of sodium sulfanilamide in a solvent mixture made up of 70 ml. of 2-methoxyethanol and 40 ml. of methanol is refluxed for 66 hrs. (reaction temperature 83–84° C.). A portion of the solvent is then distilled to afford a higher reaction temperature (92° C.), and the reaction mixture refluxed for an additional 104 hrs. One half of the solvent is then distilled and the residue diluted with 100 ml. of water. Neutral and acidic products are removed by extraction with two 100 ml. portions of ether and the aqueous phase is neutralized with dilute aqueous hydrochloric acid. After thoroughly chilling neutralized aqueous solution, the crude product is collected on a filter, washed, and dried, yield 7.32 g. (49%), M.P. 231–238° C. Purified product may be obtained by recrystallization from aqueous dimethylformamide to yield material of M.P. 243–244.5° C.

EXAMPLE XIV

2-Methylthio-4-Sulfanilamidoquinazoline

A solution containing 0.031 mole each of 2,4-bis-(methylthio)quinazoline and sodium sulfanilamide in 50 ml. of 2-methoxy-ethanol and 30 ml. of methanol is refluxed (reaction temperature 83° C.) for 24 hrs. The reaction temperature is then raised to 100° C. by distillation of a portion of the solvent and reflux continued for 96 hrs. The product is then recovered by concentration of the reaction mixture to about 30 ml., dilution thereof with an equal volume of water, and neutral and basic materials removed by extraction and ether. The aqueous raffinate is then neutralized with dilute hydrochloric acid and the product which precipitates collected by filtration, yield 2.13 g. (20%). The product is recrystallized from aqueous dimethylformamide to yield the purified material, M.P. 219–221° C.

EXAMPLE XV

2-(n-Hexyloxy)-4-Sulfanilamidoquinazoline 2,4-di(n-hexyloxy)quinazoline and sodium sulfanilamide, 0.1 mole of each, are allowed to react for 120 hrs. in 200 ml. of boiling methyl Cellosolve, according to the procedure of Example V. 2-(n-hexyloxy)-4-sulfanilamidoquinazoline is recovered from the reaction mixture in much the same fashion as is described there by concentration of the reaction mixture, dilution with water, removal of insoluble materials, and neutralization of the filtrate.

In order to further characterize the substances described, solubility data for some of them is presented in Table I. Table I also contains information relating to the distribution of these substances between chloroform and water, as determined in partition experiments. Table II contains analytical data and formulas for the named compounds of the examples.

TABLE I.—SOLUBILITIES

| Compound name | Example number | Solubility (mg./ml.) [1] | | | Chloroform-water partition [2] | | | |
|---|---|---|---|---|---|---|---|---|
| | | $CHCl_3$ | Phosphate buffer | | pH 3.6 | pH 5.5 | pH 7.4 | pH 8.2 |
| | | | pH 5.5 | pH 7.4 | | | | |
| 2-methyoxy-4-sulfanilamidoquinazoline | I | 0.19 | 0.045 | 0.055 | 78 | 89 | 58 | 36 |
| 2-methyl-4-sulfanilamidoquinazoline | IX | 0.118 | 0.023 | 0.024 | 84 | [3] 78 | 78 | 23 |
| 2-methoxy-6-chloro-4-sulfanilamidoquinazoline | XI | 0.09 | 0.01 | 0.06 | 95 | 89 | 31 | 74 |
| 2-ethoxy-4-sulfanilamidoquinazoline | II | 0.79 | 0.03 | 0.04 | 69 | 66 | 78 | 43 |
| 2,7-dimethoxy-4-sulfanilamidoquinazoline | XII | 0.45 | 0.03 | 0.05 | 89 | 85 | 70 | ca. 57 |
| 2-isopropoxy-4-sulfanilamidoquinazoline | VI | | | | 97 | 99 | 97 | [4] 92 |

[1] Measured by equilibrating an excess of solute with the solvent at 25° C. for 2 hrs; supernatant liquid analyzed for solute.
[2] Aqueous buffer solution of solute equilibrated against chloroform; expressed as percent in chloroform phase.
[3] pH 4.7.
[4] At pH 11.0, 11% in chloroform phase, and at pH 13.0, none of solute distributes to chloroform phase.

TABLE II.—ANALYSES

| Compound name | Formula | Example number | Carbon (percent by wt.) | Hydrogen (percent by wt.) | Nitrogen (percent by wt.) | Sulfur (percent by wt.) |
|---|---|---|---|---|---|---|
| 2-methoxy-4-sulfanilamido-quinazoline | $C_{15}H_{14}N_4O_3S$ | I | 55.05 | 4.36 | 17.01 | |
| 2-ethoxy-4-sulfanilamidoquinazoline | $C_{16}H_{16}N_4O_3S$ | II | 55.45 | 4.84 | 16.24 | 9.24 |
| 2-methoxy-4-(N⁴-acetylsulfanilamido)quinazoline | $C_{17}H_{16}N_4O_4SH_2O$ | III | 52.09 | 4.87 | 14.21 | 8.60 |
| Sodium 2-methoxy-4-sulfanilamidoquinazoline | $C_{15}H_{13}N_4O_3SNa$ | IV | | | 15.81 | |
| 2-n-propoxy-4-sulfanilamidoquinazoline | $C_{17}H_{18}N_4O_3S$ | V | 57.04 | 5.40 | 15.73 | 9.07 |
| 2-isopropoxy-4-sulfanilamidoquinazoline | $C_{17}H_{18}N_4O_3S$ | VI | 56.92 | 5.31 | 15.32 | 8.93 |
| 2-methoxy-4-(N⁴-butyrlsulfanilamido)quinazoline | $C_{19}H_{20}N_4O_4S$ | VII | 57.03 | 5.18 | | |
| 2-(beta-methoxyethoxy)-4-sulfanilamidoquinazoline | $C_{17}H_{18}N_4O_4SH_2O$ | VIII | 52.42 | 5.33 | 14.38 | 8.30 |
| 2-methyl-4-sulfanilamidoquinazoline | $C_{15}H_{14}N_4O_2S$ | IX | 57.03 | 4.68 | 17.82 | 9.90 |
| 2-ethyl-4-sulfanilamidoquinazoline | $C_{16}H_{16}N_4O_2S$ | X | 58.23 | 4.94 | 17.01 | |
| 2-methoxy-4-sulfanilamido-6-choroquinazoline | $C_{15}H_{13}N_4O_3SCl$* | XI | | | 15.26 | 8.78 |
| 2,7-dimethoxy-4-sulfanilamidoquinazoline | $C_{16}H_{16}N_4O_4S$ | XII | 53.44 | 4.86 | 15.01 | 8.70 |
| 2-methoxy-6-methyl-4-sulfanilamidoquinazoline | $C_{16}H_{16}N_4O_3S$ | XIII | 55.52 | 4.89 | 16.29 | 9.07 |
| 2-methylthio-4-sulfanilamidoquinazoline | $C_{15}H_{14}N_4O_2S_2$ | XIV | 52.46 | 4.28 | 15.90 | 17.41 |

*Chlorine analysis 9.60 by weight.

What is claimed is:
1. 2-methoxy-4-sulfanilamidoquinazoline.
2. Sodium 2-methoxy-4-sulfanilamidoquinazoline.
3. 2-methoxy-4-(N⁴-acetylsulfanilamido)quinazoline.

References Cited in the file of this patent

UNITED STATES PATENTS 2,473,931    Wolf _____ June 21, 1949
2,494,524    Sprague _____ Jan. 10, 1950
2,774,756    Bretschneider et al. ____ Dec. 18, 1956

FOREIGN PATENTS 589,040    Great Britain _____ June 10, 1947

UNITED STATES PATENT OFFICE
CERTIFICATE OF CORRECTION

Patent No. 3,155,650                            November 3, 1964

Frederick H. Grunwald

It is hereby certified that error appears in the above numbered patent requiring correction and that the said Letters Patent should read as corrected below.

Column 2, line 52, for "⟶ Formula" read -- ⟶ Formula I --; line 56, for "in" read -- In --; line 70, for "nad" read -- and --; column 12, line 18, after "chilling" insert -- the --.

Signed and sealed this 6th day of April 1965.

(SEAL)
Attest:

ERNEST W. SWIDER                            EDWARD J. BRENNER
Attesting Officer                               Commissioner of Patents